UNITED STATES PATENT OFFICE.

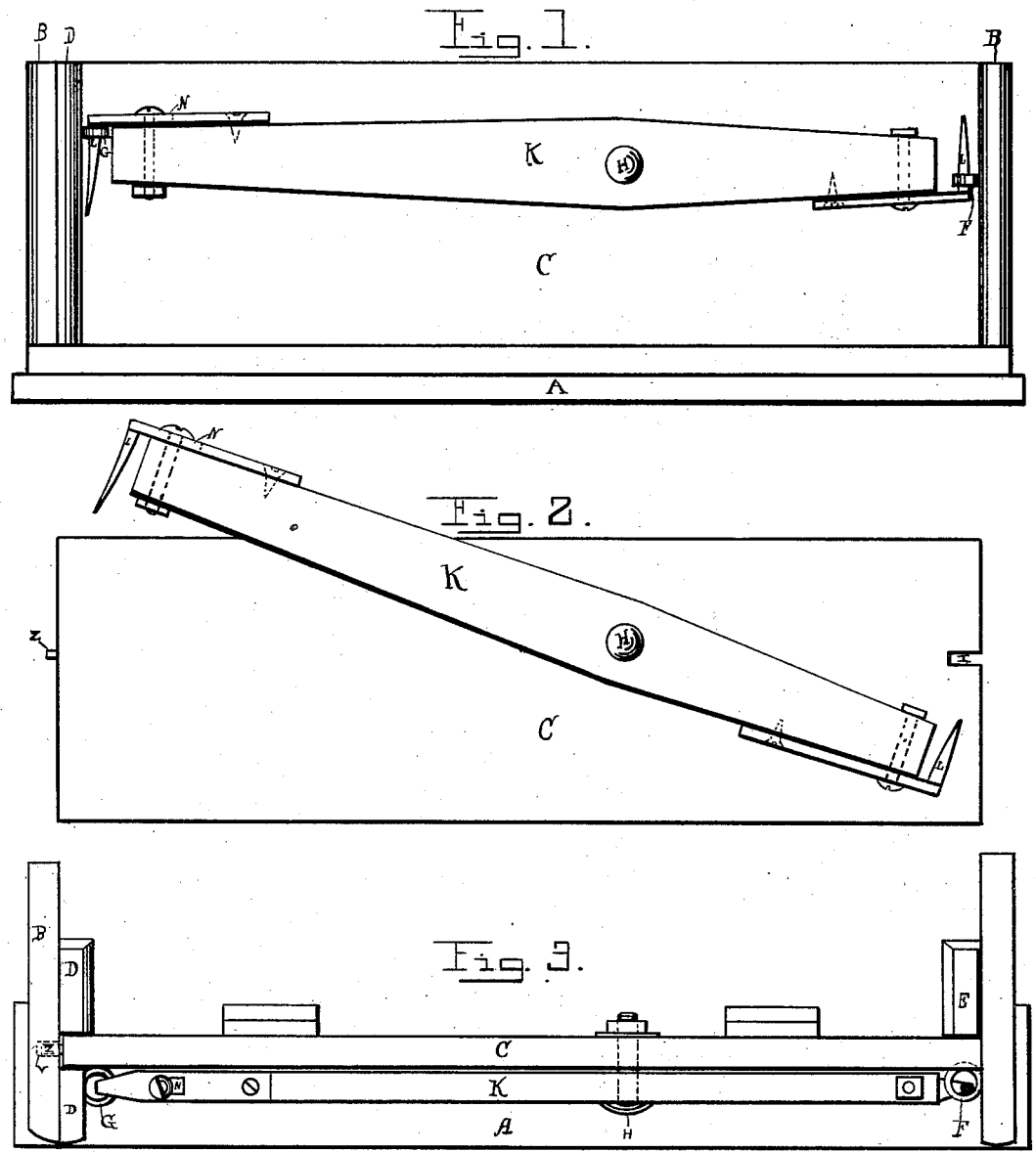

GEORGE L. SLATER, OF BUCHANAN, MICHIGAN, ASSIGNOR OF ONE-HALF TO A. J. CAROTHERS, OF SAME PLACE.

WAGON END-GATE.

SPECIFICATION forming part of Letters Patent No. 301,838, dated July 8, 1884.

Application filed April 5, 1884. (No model.)

*To all whom it may concern:*

Be it known that I, GEORGE L. SLATER, a citizen of the United States, residing at Buchanan, in the State of Michigan, have invented certain new and useful Improvements in End-Gates; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a rear view of my device. Fig. 2 is a face view of the end-gate, and Fig. 3 is a top view.

This invention has relation to the end-gates of wagons; and it consists in the construction and novel arrangement of devices, as hereinafter set forth.

In the annexed drawings, the letter A designates the bottom of the wagon, and B B the side walls. C is the end-gate, having one of its ends—preferably the left end—seated between parallel cleats D D, secured by the side of the box. The other end of the gate is designed to be pressed back against the single cleat E, secured to the opposite side of the box, as shown. This end of the gate is notched in its edge at I, to receive the ring of an eyebolt, F, which is secured to the side of the box, just in rear of the cleat E. A similar eyebolt, G, passes through the rear cleat, D, in the opposite side and through the box-wall. These eyebolts are nearly on the same level and about even with a pivot-bolt, H, which passes through the middle portion of the end-gate, somewhat to the right of the center. By means of the pivot-bolt H the fastening-bar or lever-latch K is connected to the rear wall of the end-gate. This lever-latch is of sufficient length to extend nearly from one side to the other of the wagon-box, and is provided at its ends with adjustable hooks reversed with respect to each other, and adapted to engage the eyebolts F and G. Each hook L is made with a flat shank, which is slotted longitudinally, as shown at N. The hook L on the left-hand end of the lever-latch is fastened to its upper edge. It projects beyond the end of the lever-latch and is turned downward. The hook which is attached to the other or short arm of the lever-latch is secured to the lower edge, and, projecting beyond the end of the arm, is turned upward. Clamp-screws passed through the slotted shank of the hooks secure them firmly in position. These hooks can be adjusted out or in, to correspond exactly with the width of the wagon-box. The left arm of the lever-latch is longer and heavier than that on the right, and when the gate is placed in position in the box and the lever turned in horizontal position the hooks of the latter will engage the eyebolts F and G and secure the end-gate. The weight of the long arm of the lever will hold it in position and prevent the hooks from disengagement. A strong pin, Z, projects from that edge of the end-gate which is seated between the cleats, and engages a bearing, V, in the side wall of the box. It serves to prevent this end of the gate from rising, while the opposite end is held down by the engagement of its notch with the eyebolt F.

Having described this invention, what I claim, and desire to secure by Letters Patent, is—

1. The combination, with an end-gate, of the double and single cleat bearings of the box-walls, the eyebolts secured to the box-walls, and the lever-latch pivoted to the end-gate, and having at the end of its long or weighted arm a downwardly-turned hook, and at the end of its short arm an upwardly-turned hook, said hooks being adapted to engage said eyebolts when the lever-latch is turned horizontally, substantially as specified.

2. The combination, with the double and single cleat bearings and the eyebolts of the box-walls, of the end-gate having a notch at one end and a pin at the other, and a lever-latch pivoted at one side of the center of the end-gate, and having relatively-reversed end hooks, substantially as specified.

In testimony whereof I affix my signature in presence of two witnesses:

GEORGE L. SLATER.

Witnesses:
A. A. WORTHINGTON,
A. J. CAROTHERS.